United States Patent [19]

Hejzlar et al.

[11] 3,848,463

[45] Nov. 19, 1974

[54] SLIP-RELEASE LINEAR FORCE GAUGE FOR DETECTING COMPRESSION AND TENSION FORCES WHICH EXCEED A STANDARD FORCE

[75] Inventors: Sid Hejzlar; Robert M. Zweig, both of Flushing, N.Y.

[73] Assignee: John Chatillon & Sons, Inc., Kew Gardens, N.Y.

[22] Filed: Apr. 20, 1973

[21] Appl. No.: 352,966

[52] U.S. Cl.............................. 73/141 AB, 73/88 B
[51] Int. Cl............................................... G01l 5/00
[58] Field of Search.......... 73/141 AB, 141 A, 88 B, 73/150 A

[56] References Cited
UNITED STATES PATENTS

| | | | |
|---|---|---|---|
| 1,141,562 | 6/1915 | Law................................. | 73/141 AB |
| 2,612,042 | 9/1952 | Clarke............................. | 73/141 AB |
| 3,272,002 | 9/1966 | Dickman.......................... | 73/88 B |
| 3,546,933 | 12/1970 | Grabovac......................... | 73/141 A |

Primary Examiner—James J. Gill, Jr.
Assistant Examiner—Anthony V. Ciarlante
Attorney, Agent, or Firm—Bryan, Parmelee, Johnson & Bollinger

[57] ABSTRACT

A slip-release linear force gauge for detecting compression and tension forces which exceed a preselected standard force value by comparing two angularly opposing torques, one a preset standard torque, the other a test torque, which act upon the same balance arm about a common fulcrum point. The gauge includes a supporting frame having a fulcrum point, and a rigid balance arm pivotally mounted in the supporting frame about the fulcrum point. A spring coupled to one end of the rigid balance arm generates a standard torque about the fulcrum point by exerting a force which does not pass through the fulcrum point. An adjusting mechanism for variably preselecting the value of the standard torque generated by the spring force is provided. Stop means for limiting rotation of the rigid balance arm in response to the spring generated torque is also provided. A test force detector shaft is slidably mounted in the supporting frame and disengagably coupled to the other end of the rigid balance arm for generating a test torque in response to a test force applied to it. The slidable shaft is disposed to slip from its preset position when the test force applied to it generates a test torque which exceeds the preselected standard torque generated by the spring, thereby causing the rigid balance arm to rotate.

11 Claims, 6 Drawing Figures

PATENTED NOV 19 1974

SLIP-RELEASE LINEAR FORCE GAUGE FOR DETECTING COMPRESSION AND TENSION FORCES WHICH EXCEED A STANDARD FORCE

BACKGROUND OF THE INVENTION

This invention relates to a linear force gauge for detecting compression and tension forces which exceed a preselected standard force value.

Linear force gauges are presently used in a wide variety of applications. For example, they are used to test solder connections in wired electrical circuitry that frequently are required to withstand a specific tension detachment force. Similarly, force gauges are used to test welded joints in certain steel constructions to determine if they can withstand a specified tension force. The corners in corrugated cardboard box constructions often are required to withstand a specified compressive bursting force. Force gauges may similarly be employed in this testing operation.

The slip-release linear force gauge of the present invention can be used with advantage to perform these testing functions.

Typically, a prior art linear force gauge measures tension or compression forces by registering the force applied to a test structure on an output dial. This means of operation requires a skilled operator to simultaneously observe both the test structure to insure that the test force is being properly applied and, the output dial to determine the value of the test force. It is desirable from a cost and manpower procurement viewpoint to provide a linear force gauge which can be operated by an unskilled worker.

The slip-release linear force gauge, in accordance with the present invention, is of the "go-no go" type wherein there is a simple visual manifestation indicating if the test force exceeds a preset standard force value. If the test force fails to exceed the standard force value, the device does not register a change. This characteristic permits an unskilled operator to perform the test and observe only the test structure.

SUMMARY OF THE INVENTION

The present invention is a slip-release linear force gauge, a preferred embodiment of which is illustrated in the accompanying drawings as a hand held device, having a test force detector shaft with a compression pad on one end and a tension hook on the other. The compression pad and tension hook are adapted to be engaged by a test piece. The slip-release gauge is constructed so that the operator may set it to compare a test force with any preselected, specified standard force value, as indicated by the read-out on a linear scale, by turning a hand knob.

By engaging the test piece with either the compression pad or the tension hook and linearly pushing or pulling the gauge frame, the operator can determine if the standard linear force has been exceeded merely by observing whether or not the detector shaft has slipped. Thus, the present preferred embodiment of the invention is operated in much the same manner as are the well known "go-no go" gauges used in quality control systems.

In the preferred embodiment of the present invention, to be described hereinbelow in detail, the slip-release linear force gauge includes a supporting frame having a fulcrum point therein and a rigid balance arm pivotally mounted in the supporting frame about the fulcrum point. A spring, provided with an adjustment mechanism for varying the tension spring force, is coupled to one end of the rigid balance arm so that the tension spring force passes on one side of the arm's fulcrum point. This arrangement causes the spring to thereby generate a standard torque about the arm's fulcrum point. The adjustment mechanism is pivotally fixed at a point in the supporting frame base so that the spring tension force extends linearly from the adjustment mechanism pivot point to the end of the rigid balance arm. A stop is positioned to prevent complete rotation of the balance arm under the influence of the spring. A test force detector shaft is located to operate in a line of force on the opposite side of said fulcrum point from the spring force. The shaft has an annular constricted neck section for engaging the other end of the rigid arm, is slidably mounted in the supporting frame.

A test force, applied to the detector shaft, is similarly transmitted to the rigid balance arm, the end of which is engaged by the constricted shaft neck. This test force, which does not pass through the arm's fulcrum point, thereby generates a test torque, angularly opposed to the standard torque, about the fulcrum point of the arm. When the test torque exceeds the standard torque, the rigid balance arm rotates under the influence of the torque imbalance, the end of the rigid balance arm received by the constricted shaft neck disengages, and the detector shaft slips from its preset position. If the test torque fails to exceed the standard torque, the rigid balance arm does not rotate, the end of rigid balance arm does not disengage from the constricted shaft neck, and the detector shaft does not slip. Hence, the slip-release linear force gauge only registers if the test force generated by a test force exceeds the pre-selected standard torque generated by the spring force.

The preferred embodiment of this invention compares two angularly opposing torques, one a preset standard torque, the other a test torque, which act upon the same balance arm about a common fulcrum point.

The spring and the balance arm cannot be disposed relative to each other at random, however. They should be arranged so that the standard torque against which a test torque is compared, is the maximum torque generated by the spring during the rotational travel of the rigid balance arm. If this were not the case, that is, if the gauge was set to compare a test torque with a standard torque which increased during operation, the test torque would have to exceed the standard torque plus some additional increment equal to the standard torque increase. Gauge registration would only occur when a test force greater than the standard force plus an addition increment of force was applied. Accuracy would be sacrificed. Accordingly, the gauge should be arranged so that the standard torque, against which test torques are compared, is at its maximum value with the range of travel of the rigid balance arm. Alternatively, the gauge may merely be calibrated to compare test torques to this maximum value without being initially so arranged. This aspect of the present invention will be more fully explained hereinbelow.

Accordingly, it is an object of the present invention to provide a unique and novel method and apparatus for detecting compression or tension forces which exceed a preselected standard force.

Other objects, aspects, and advantages of the present invention will be pointed out in, or will be understood from the following detailed description, when considered with the accompanying drawings.

BRIEF DESCRIPTION OF THE DRAWINGS

Corresponding reference numerals indicate corresponding structural elements and characteristic features in each of the respective drawings.

DESCRIPTION OF THE PREFERRED EMBODIMENT

Referring to FIGS. 1, 2, 3, and 4, the slip-type linear force gauge 10, constructed in accordance with the preferred embodiment of the present invention, is shown in its operating position, set to detect compression or tension forces which exceed a preselected standard force. This force gauge 10 includes an internal gauge mechanism 12 housed in an elongated, C-shaped supporting frame 14 sealed by a mechanism hood 13. The supporting frame 14, which may be fabricated from any suitably rigid material, for example metal or plastic, includes a base 15, a back 17, a fulcrum point 11 and a top 19. The internal gauge mechanism 12 is supported on the frame 14 and has a rigid balance arm 16, pivotally mounted at the fulcrum point on a main pivot pin 18. Two opposing extensions 20, 22 of the arm define an obtuse angle with the fulcrum point 11 as its vertex. The first extension 20 is formed with two parallel fingers 24 and 26 which describe a slot 28 across the outer end of which is mounted an attachment pin 30. An adjustable stop screw 31, provided with a lock nut 33, is tapped into the support body 14 opposite one of the fingers 24 to position the rigid arm 16 and limit its counterclockwise rotation as viewed in FIGS. 1 and 2.

Figure 6:
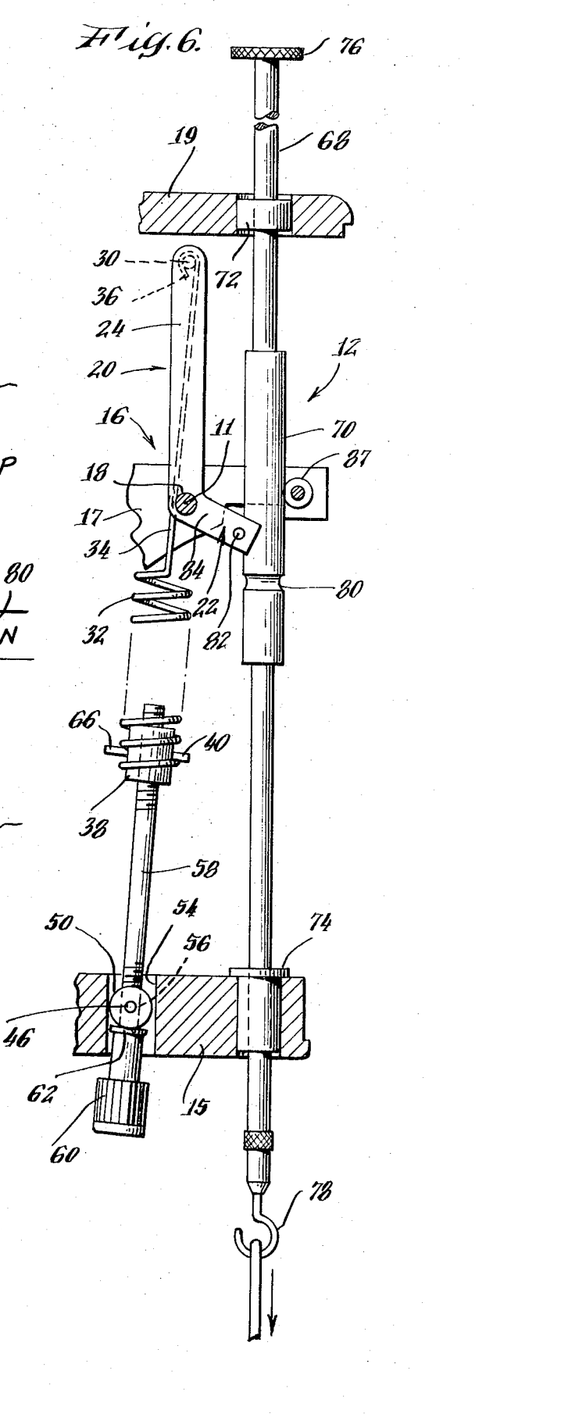
FIG. 6 is a front elevational view of this slip-release linear force gauge shown after the rigid arm has been disengaged from the shaft neck and the detector shaft has slipped under the influence of a test force exceeding the preselected standard force.

The internal gauge mechanism 12 also has a coil spring 32, charactertized by a known linear force constant, having a straight wire lead 34 integrally formed from its last coil. The coil spring 32 generates a variably adjustable force. The wire lead 34 terminates in a hook 36 which engages the rigid arm attachment pin 30 to couple the spring 32 to the arm 16. The wire lead 34 is of length sufficient to position the coil spring 32 below the main pivot pin 18 so that it does not interfere with the pivoted travel of the rigid balance arm 16 during the force testing operation. The slot 28 further accommodates the wire lead 34 as shown in FIG. 2, when the arm assumes its displaced position as shown in FIG. 6 in response to a test force in excess of the standard force valve.

A tapped bushing 38, having an internal threaded bore is tightly mounted at the base of the coil spring 32 in the center of the coils. A transverse pin 40, mounted in the bushing 38 perpendicularly to the bushing axis is used to establish the desired spring constant during calibration by winding the bushing into the spring so that the pin controls the desired number of active spring coils.

Figure 4:
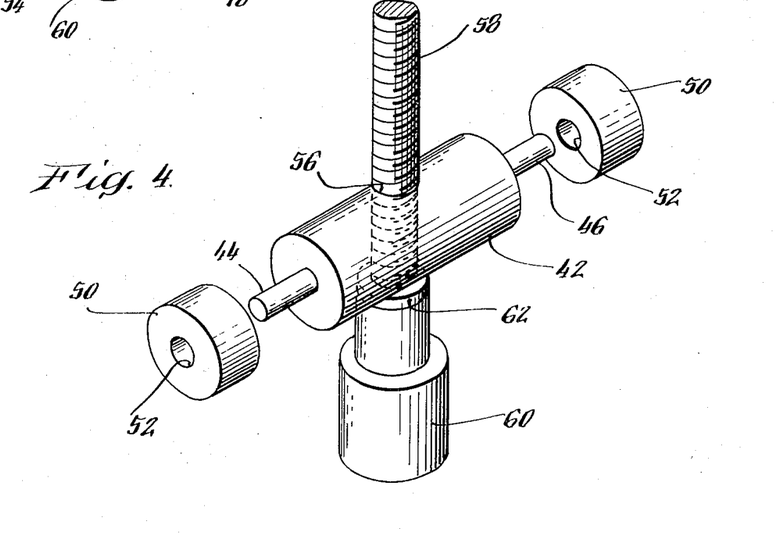
FIG. 4 is an enlarged view of the spring force adjustment mechanism base point showing its pivoting characteristic.

A restraining cylinder 42, shown in detail in FIG. 4, is provided with oppositely extending axle portions 44 and 46. This restraining cylinder is pivotally mounted between two positioning rings 50 in a hole 48 in the base 15 of gauge support frame 14 of sufficient diameter to permit free cylinder pivotal rotation. Each of the positioning rings 50 has a central hole 52 which receives one of the oppositely extending cylinder axle portions 44 and 46. The positioning rings 50 are force-fitted into the cylinder mounting hole 48 and are secured against disengagement by crimping the body material surrounding the mounting hole 48 about them. Other securing means such as welding or soldering may alternatively be utilized. This pivoted cylinder arrangement is disposed so that the axis of the restraining cylinder 42 is parallel to the axis of the main pivot pin 18 on which the rigid arm 16 is mounted.

Figure 1:
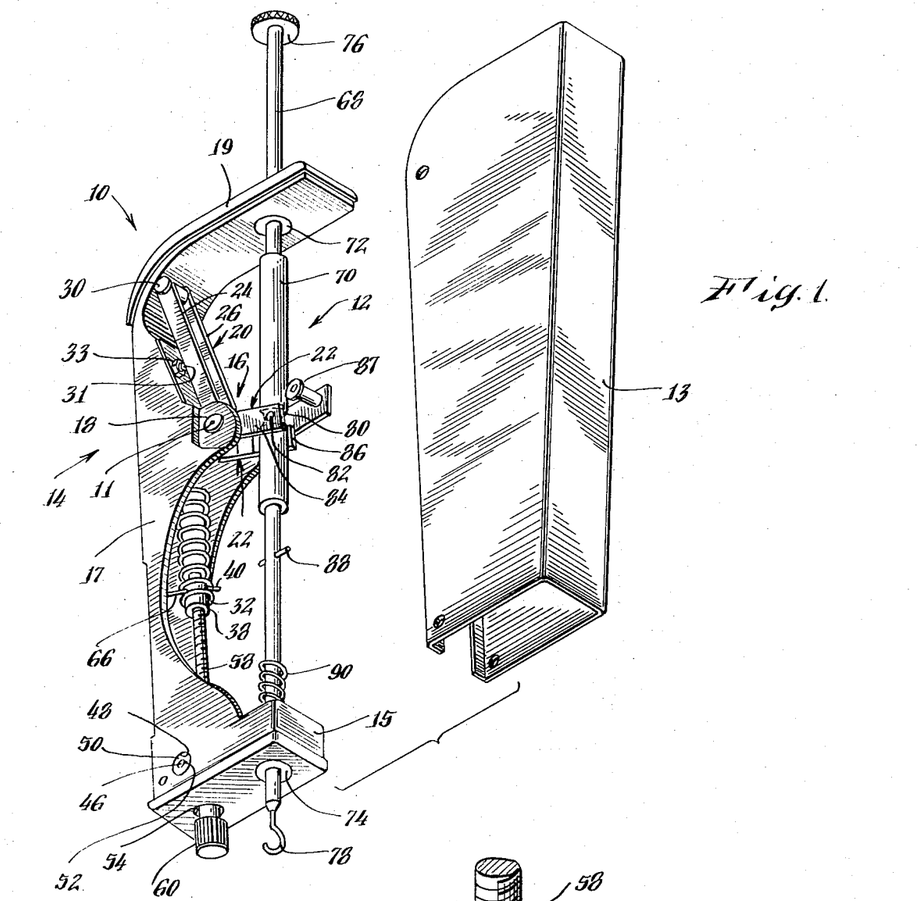
FIG. 1 is a perspective view of the slip-release linear force gauge for detecting test forces which exceed a preselected standard force, shown in its preset position with the mechanism hood removed.
Figure 2:
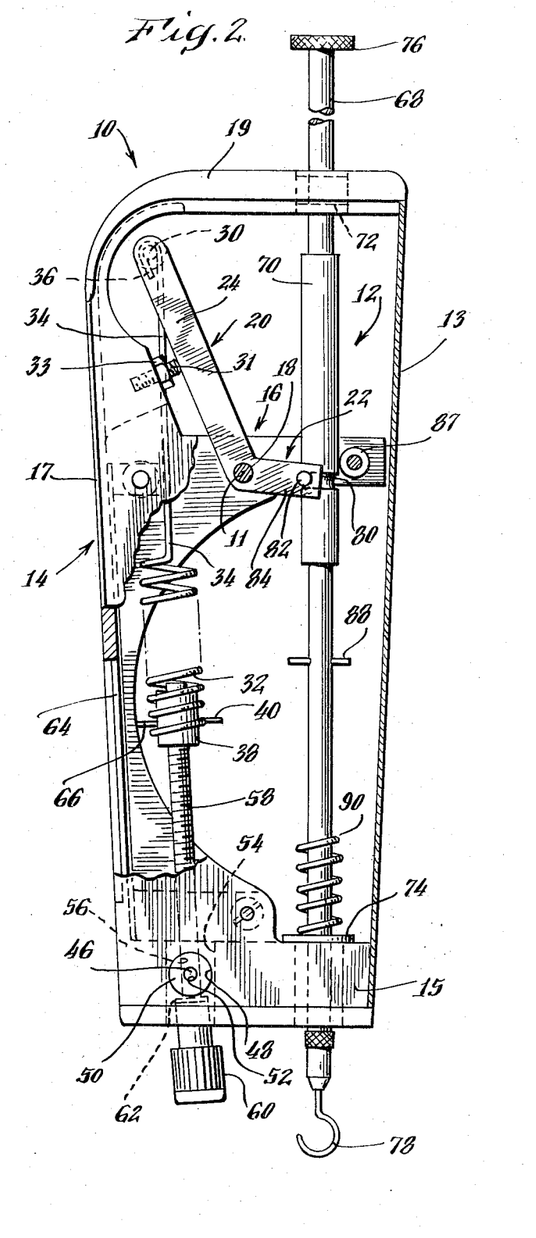
FIG. 2 is a front elevational view of this slip-release linear force gauge similarly shown in its preset position.
Figure 3:
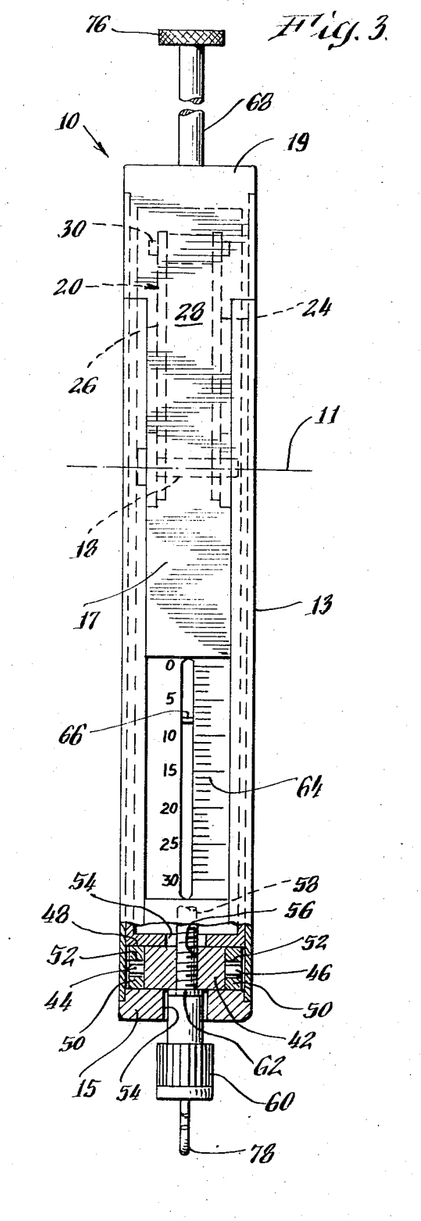
FIG. 3 is a side elevational view of this slip-release linear force gauge looking toward the right showing in detail the scale by which the standard force is preselected.

The base of the gauge support body 15 shown in FIGS. 1, 2, and 3 is provided with a second hole in the form of a spindle conduit 54 disposed perpendicularly to and intersecting the cylinder mounting hole 48. The restraining cylinder 42 is similarly provided with a spindle conduit 56 disposed perpendicularly to and intersecting the cylinder axis. A threaded spindle 58, having an enlarged knurled knob 60 attached to its base, is mounted with its base loosely disposed in the body spindle conduit 54 and the cylinder spindle conduit 56 and its head engaged by the threaded bore in the tapped spring bushing 38. A washer 62 is disposed so that it abuts the neck of the knurled knob 60. The cylinder spindle conduit 56 is of sufficient diameter to permit free rotation of the spindle but simultaneously restrain upward movement of the washer 62, the knurled knob 60 and hence the base of the spindle 58. The body spindle conduit 54 is of sufficient diameter to freely accommodate both the washer 62 and the neck of the knob 60.

This pivoted restraining cylinder system enables the spring system to pivot about a fixed point in the supporting frame, insuring that the balance arm will not be unduly restricted in its range of travel. Other means, alternative to that described, may be employed to pivot the spring system in the supporting frame at a fixed point.

Since the axis of the pivoted restraining cylinder 42, in which the spindle 58 is mounted, is parallel to the axis of the main pivot pin 18, the spindle 58 and rigid arm 16 pivot in the same plane. This insures that the tension force exerted by the coil spring 32 on the rigid arm extension 20 linearly extends between the arm attachment pin 30 and the cylinder axis. This tension force may be adjustibly varied merely by rotating the knurled knob 60 thereby rotating the spindle 58, which in turn draws the spring bushing 38 down extending the coil spring 32. Since the coil spring force characteristic is known, a scale 64 may be disposed in the support body back 17 and a pointer 66 may be attached to the spring 32. The scale 64 and the pointer 66 are then calibrated so that they form a means for relating the linear spring force and the standard torque which the linear spring force generates to the predetermined force level which test forces must exceed to cause the gauge 10 to register.

The internal gauge mechanism 12 as shown in FIGS. 1, 2, and 3, further includes a force detector shaft 68, having a center section 70 of enlarged diameter. The shaft is slidably positioned by two linear bearing bushings 72 and 74, the first of which is mounted in the top 19 of the supporting frame 14, the second of which is mounted in the base 15. A force compression pad 76 is carried on top of the shaft 68 and a tension hook 78 is carried on the bottom, both exterior to the supporting frame 14.

The enlarged section 70 of the detector shaft 68 is formed with a constricted annular neck 80 which receives a slip pin 82 when the force gauge is in its preset position as shown in FIGS. 1 and 2. The slip pin 82 spans the two parallel fingers 84 and 86 which form the second rigid balance arm extension 22 at its end. For efficiency, this second extension 22 is substantially perpendicular to the detector shaft enlarged section 70 when the force gauge 10 is in its preset position. The slip pin 82 may with advantage be a roller or may otherwise be provided with antifriction means to facilitate free disengagement from the constricted shaft neck.

An opposing rod 87 is mounted in the support frame 14 to prevent outward transverse bending of the shaft 68. Additionally, the slip pin 82 presses the enlarged shaft section 70 against the opposing rod 87 when the slip pin 82 is disengaged from the shaft constricted neck 80. This arrangement creates friction between the slip pin 82, the enlarged shaft section 70 and the opposing rod 87 which serves to retard the linear motion of the detector shaft 68 after the gauge 10 registers.

A stop 88 is mounted in the shaft 67 below the enlarged shaft section 70 perpendicular to the shaft axis. A stop spring 90 loosely encircles the shaft 68 between the stop 84 and the lower linear bearing bushing 74. When the slip pin 82 disengages from the constricted annular neck 80 and the shaft 68 slips, the stop 88 engages the stop spring 90 which in turn abutts the lower linear bushing 74. This abutting arrangement, in conjunction with the retarding friction discussed above, prevents internal damage to the mechanism during operation.

As noted above, it is important that the standard torque, against which a test torque is compared, is the maximum torque generated by the spring 32 during the rotational travel of the rigid balance arm 16. If this were not the case, that is, if the gauge was set to compare a test torque with a standard torque which increased during operation, rotation of the rigid balance arm 16 would cause an increase in the standard torque. This increase in standard torque would require that a correspondingly increased test force be applied to the detector shaft 68 to cause the gauge to register. Thus, the measuring capacity of the gauge would vary from that set by the adjustable spring 32 and contribute to inaccuracy. The amount of inaccuracy that can be tolerated depends upon the tolerances of the measured force. Therefore, although the point of maximum torque is desirable, the gauge may be useful at other settings.

With the coil spring 32 and the rigid balance arm 16 arranged as shown in FIGS. 1 and 2, rotation of the arm 16 upon registration of the gauge 10 causes the spring 32 to increase in length. This increase in spring length results in a corresponding increase in the linear spring force. Simultaneously, balance arm rotation causes the spring force moment arm about fulcrum point 18 to decrease. Hence, the product of the standard spring force and the spring force moment arm, i.e., the standard torque, varies as the balance arm 16 rotates.

If the product of the spring force and the spring force moment arm, i.e., the standard torque, is to decrease from a maximum or is not to increase upon balance arm rotation, the first balance arm extension 20 should be initially positioned by the stop screw 31 so that the preset standard torque is at its maximum within the range of travel of the balance arm 16. For given systematic parameters there is an angle $\alpha$, formed by the first balance arm extension 20 and the spring force represented by the spring wire lead 34, which satisfies this condition.

Alternatively, the gauge 10 may be calibrated so that any test torque is compared with the maximum standard torque within the balance arm's 16 range of travel without initially positioning the first balance arm extension 20 and the spring wire lead 34 so that maximum torque is generated at the rest position. Nevertheless, it is important to know where that maximum torque is generated and hence is important to know the angle $\alpha$ if the gauge 10 is to be correctly calibrated.

Figure 5:
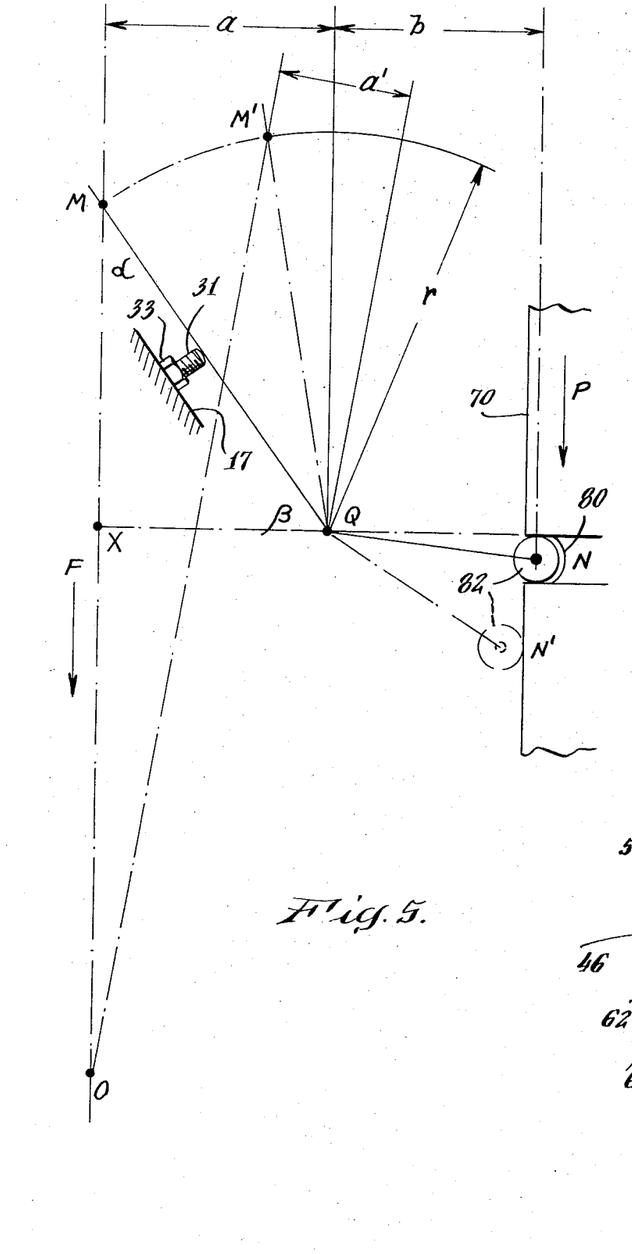
FIG. 5 is a schematic representation of the components of the slip-release linear force gauge showing parameters considered necessary for efficiency of operation.

Determination of the point within the range of travel of the rigid balance arm 16 at which the spring 32 generates maximum torque, that is, calculation of the angle $\alpha$, and the principles of operation of the present invention are best described by reference to the schematic representation offered in FIG. 5. The stretched coil spring 32, attached to the rigid arm 16 and pivotally fixed in the supporting frame base 15 through the spindle 58, knob 60 and restraining cylinder 56, is represented by line OM. The first extension 20 of the rigid arm 16 is represented by the line MQ; the second extension 22 is represented by the line NQ. The arm fulcrum point 11 at the main pivot pin 18 is represented by point Q. The enlarged shaft section 70 and constricted annular neck 80 are shown in partial view. The stop screw 31 and lock nut 33 are shown in detail. The positions of these respective elements after the gauge has registered are represented by lines OM', M'Q and N'Q.

The adjustable coil spring line of force is represented by OM along which is generated a tension force F between points O and M. This force F, in turn, generates a standard counterclockwise torque $T_1$ about the fulcrum point Q which is equal to the product of the tension force and the moment arm $a$, i.e.

$$T_1 = F \times a$$

The moment arm $a$ is initially described by line XQ. The stop screw 31 prevents counterclockwise rotation of the rigid arm extensions MQ and NQ, when the torque $T_1$ is not opposed by a counterbalancing test torque.

When a test force P is applied to the detector shaft 68, a clockwise test torque $T_2$ about the point Q is generated, which equals the product of the test force P and the moment arm $b$ (QN), i.e., $$T_2 = P \times b$$

So long as $T_2$ is less than $T_1$ or if $P \times b$ is less than $F \times a$, the force of the adjustable spring F prevails and the detector shaft 68 remains stationary. As the test force P increases, the test torque $T_2$ increases and when torque $P \times b$ is greater than torque $F \times a$, the slip pin 82 will disengage from the constricted neck 80 and the shaft 68 will slip down to indicate that the linear standard force has been exceeded.

The angle $\alpha$, at which the torque $T_1 = F \times a$ is a maximum within the range of travel of the balance arm 16, is calculated as follows, if:

1. $\alpha$ equals the angle between the rigid arm MQ and the linear spring force along MO.
2. $\beta$ equals the angle between the rigid arm MQ and the moment arm XQ,
3. $F$ equals the preset tension spring force along line MO,
4. $a$ equals XQ equals the moment arm of force F about point Q,
5. $T_1$ equals $F \times a$ equals the standard torque generated by the coil spring about point Q,
6. $U$ equals the tension spring force along line OX,
7. $S$ equals the spring rate which equals the tension spring force divided by unit deflection, and
8. $r$ equals MQ which equals the radial distance from fulcrum point Q to spring attachment point M;

Then:
9. $a = r \cos \beta = r \sin \alpha$
10. $F = U + Sr \sin \beta = U \, Sr \cos \alpha$
11. $T_1 = F \times a$ or 12. $T_1 = (U + Sr \sin \beta) \, r \cos \beta$
13. $T_1 = (U + tSr \cos \alpha) \, r \sin \alpha$ By maximizing $T_1$ in terms of $\alpha$ it has been determined that the desired value of $\alpha$ is given by:

14. $\cos \alpha = -F \mp \sqrt{F^2 + 4S^2 r^2}/2 \, sr$

After $\alpha$ is established for the given systematic parameters $F$, $r$, and $S$, $a = r \sin \alpha$ may be calculated.

The spring wire lead 34 and the balance arm first extension portion 20 may be arranged to form an angle other than $\alpha$ in their rest position provided the gauge 10 is calibrated accordingly. In practice, however, it has been found that efficiency of operation and ease of fabrication of the gauge 10 are enhanced if the wire lead 34, balance arm extension portion 20 and the stop screw 31 are arranged so that they form an angle 3° less than $\alpha$. This insures that the spring generated torque decreases when the balance arm 16 rotates. Accordingly, the spring generated torque does not exceed $F \times a = T_1$ the preselected standard torque. When the test torque $T_2$, equal to $P \times b$, exceeds $F \times a$ the gauge registers, that is when 15. $F \times a < P \times b$ Thus, in practice, once the detector shaft 68 begins to slip under the influence of a constant torque $P \times b$, registration of the gauge must be completed because the opposing standard torque thereafter decreases. Since $a$ is constant and $b$ is essentially constant, $P$ is directly proportional to $F$. Therefore, the gauge may, in practice, be directly calibrated in terms of $P$ the tested applied force. Accordingly, increasing the spring length by turning the threaded spindle increases the spring tension force 58 which requires that a proportionally larger test force be applied to cause the gauge to register.

Operation of this slip-release linear force gauge 10 will be described with reference to FIGS. 1 through 6. The gauge 10 is first properly calibrated. A standard force, against which test forces are to be compared, is preselected by adjusting the spring tension by turning the knurled knob 60. The standard force is indicated by the relative position of the pointer 66 and the scale 64. A test compression force is then applied to the compression pad 76 or a test tension force is applied to the tension hook 78. If the test force exceeds the preselected standard force, the slip pin 82 disengages from the constructed annular neck 80 and the detector shaft 68 slips down to the position shown in detail in FIG. 6. If the test force fails to exceed the standard force, the gauge does not register. By way of illustration, if hand-wired electrical circuit connections are being tested, the tension hook 78 is hooked over a wire. The supporting frame 14 of the gauge 10, which is preset to test the ability of the connection to withstand a specified test force, is then pulled. If the gauge registers, the connection has withstood the test force. If the connection breaks and the gauge does not register, the connection has failed to withstand the test force.

Although a specific embodiment of the invention has been disclosed in detail herein, it is to be understood that this is for purposes of illustration only. This disclosure of a slip-release linear force gauge should not be construed as limiting the scope of the invention, since modifications may be made in the described structure by those skilled in the art in order to adapt the device to particular force testing applications.

We claim:

1. A slip-release linear force gauge for detecting compression and tension forces which exceed a predetermined standard force level comprising:

a supporting frame having a fulcrum point located therein, rigid balance arm means pivotally mounted in said supporting frame on said fulcrum point, means for generating a predetermined standard torque acting upon said balance arm means in one direction about said fulcrum point, means for relating the predetermined standard torque to the predetermined standard force level against which tension and compression forces are tested, detector means slidably mounted in said supporting frame to assume a preset position and coupled to said balance arm means for generating a test torque in response to tension and compression forces applied to said detector means, the test torque acting upon said balance arm means about said fulcrum point in a direction opposed to the predetermined standard torque, said detector means being disposed to linearly slip from its preset position when the test torque exceeds the standard torque thereby indicating that the tension or compression force has exceeded the predetermined standard force level.

2. A slip-release linear force gauge for detecting compression and tension forces which exceed a predetermined force level comprising:
a supporting frame having a body with a fulcrum point disposed therein,
a rigid balance arm having first and second extension portions with first and second ends respectively, pivotally mounted at the junction of said first and second extension portions on said fulcrum point,
means for generating a predetermined linear force, arranged to act upon said first end of said balance arm to produce a predetermined standard torque about said fulcrum point,
means for relating the predetermined linear force and the predetermined standard torque to the predetermined standard force level against which forces are tested,
means for restraining said first balance arm extension to limit rotation of said balance arm in one direction under the influence of the predetermined standard torque and for positioning said balance arm in a preset attitude,
a detector shaft longitudinally slidably mounted in said supporting frame, having an annular constricted neck for disengagably receiving said second end of said balance arm when in the preset attitude, said detector shaft being arranged to engage a test piece for generating a longitudinal test force to produce a test torque acting upon said second end of said balance arm about said fulcrum point, the test torque being opposed to the predetermined standard torque,
said second balance arm end being disposed to disengage from said constricted shaft neck permitting said detector shaft to longitudinally, linearly slip from its preset attitude and permitting said balance arm to rotate from its preset attitude when the test torque exceeds the standard torque thereby indicating that the test force has exceeded the predetermined standard force level.

3. The slip-release linear force gauge as claimed in claim 2 wherein said predetermined linear force generating means is a spring, mounted so that the line of force of said spring does not intersect said fulcrum point when said balance arm is in its preset attitude, for generating the predetermined linear force between said first end of said rigid balance arm and said supporting frame to thereby generate the standard torque.

4. The slip-release linear force gauge as claimed in claim 2 wherein said second end of said rigid arm means is provided with antifriction bearing means to permit free disengagement of said second end and said constricted neck portion.

5. The slip-release linear force gauge as claimed in claim 2 having opposing rod means mounted in said supporting frame to limit transverse bending of said shaft when said second balance arm end disengages from said constricted neck and for creating retarding friction between said opposing rod and said detector shaft and between said second balance arm end and said detector shaft to retard linear travel of said detector shaft when said shaft slips under the influence of a test force exceeding the predetermined force level.

6. The slip-release linear force gauge as claimed in claim 2 wherein said predetermined linear force generating means is provided with adjustment means for variably, selectively preselecting the linear force generated by said linear force generating means.

7. The slip-release linear force gauge as claimed in claim 6 wherein said predetermined linear force generating means is a spring, mounted so that the line of force of said spring does not intersect said fulcrum point when said balance arm is in its preset attitude, for generating a predetermined linear force between said rigid arm means and said adjustment means to thereby generate the standard torque.

8. The slip-release linear force gauge as claimed in claim 7 wherein said adjustment means comprises:
a bushing, having threaded bore, mounted in said spring,
a threaded spindle rotatably mounted in said bushing threaded bore,
a control knob mounted at one end of said spindle, on the exterior of said supporting frame, and
pivoting restraining means for restraining said control knob on the exterior of said supporting frame and for pivoting said control knob and said spindle relative to said supporting frame to permit said spring to generate a linear tension force between said rigid arm means and said control knob.

9. The slip-release linear force gauge as claimed in claim 2 in which said means for relating the predetermined standard linear force and the predetermined standard torque to the predetermined standard force level against which test forces are tested comprises a scale and pointer, mounted in said supporting frame, calibrated so that the pointer indicates on the scale what test force applied to said detector shaft will cause said detector shaft to slip from its preset attitude.

10. The slip-release linear force gauge as claimed in claim 2 wherein said detector shaft has first and second ends, and wherein said first end carries a compression pad engaging a test piece to detect compression forces and said second end carries a tension hook for engaging a test piece to detect tension forces.

11. A slip-release linear force gauge for detecting compression and tension forces which exceed a predetermined force level comprising:
a supporting frame having a fulcrum point located therein,
rigid balance arm means pivotally mounted in said supporting frame on said fulcrum point,
means for generating a predetermined standard torque acting upon said balance arm means about said fulcrum point, said balance arm means and said standard torque generating means being arranged to generate a maximum predetermined standard torque within the range of pivoted travel of said balance arm means,
means for relating the predetermined standard torque to the predetermined standard force level against which test forces are tested,
means for limiting rotation of said balance arm means in one direction under the influence of the predetermined standard torque and for positioning said balance arm means in a preset attitude, said limiting means, said balance arm means and said standard torque generating means being arranged so that the maximum predetermined standard torque within the range of pivoted travel of said balance arm means is generated when said balance arm means is in its preset attitude, detector means slidably mounted in said supporting frame to assume a preset attitude and coupled to said balance arm means for generating a test torque in response to a test force applied to said detector means, the test torque being angularly opposed to the maximum predetermined standard torque and acting upon said balance arm means about said fulcrum point, said detector means being disposed to linearly slip from its preset attitude when the test torque exceeds the maximum predetermined standard torque thereby indicating that the test force has exceeded the standard force level.

* * * * *

UNITED STATES PATENT OFFICE
CERTIFICATE OF CORRECTION

Patent No. 3,848,463  Dated November 19, 1974

Inventor(s) Sid Hejzlar; Robert M. Zweig

It is certified that error appears in the above-identified patent and that said Letters Patent are hereby corrected as shown below:

Column 7, line 50, "14. $\cos = -F \mp \quad F^2 + 4S^2 r^2 / 2_{Sr}$" should be --14. $\cos \alpha = \dfrac{-F \pm \sqrt{F^2 + 4S^2 r^2}}{2\,Sr}$ --.

Column 8, line 24, "constructed" should be --constricted--.

Column 11, line 7, "angularly" should be deleted.

Signed and sealed this 18th day of March 1975.

(SEAL)
Attest:

RUTH C. MASON
Attesting Officer

C. MARSHALL DANN
Commissioner of Patents
and Trademarks